COMPLEMENTING APPARATUS

Filed Jan. 20, 1958

| DECIMAL | BINARY CHARACTER |
|---|---|
| 0 | 1000 |
| 1 | 0100 |
| 2 | 1100 |
| 3 | 1010 |
| 4 | 1110 |
| 5 | 0111 |
| 6 | 0101 |
| 7 | 0011 |
| 8 | 0010 |
| 9 | 0001 |

INVENTORS
MERWIN KLIMAN
SEYMOUR KASS
BY
R. J. Braddock
ATTORNEY 3,021,518
COMPLEMENTING APPARATUS Merwin Kliman, Glen Head, and Seymour Kass, Syosset, N.Y., assignors to Sperry Rand Corporation, a corporation of Delaware Filed Jan. 20, 1958, Ser. No. 709,872
8 Claims. (Cl. 340—347)

Figures 1, 2:
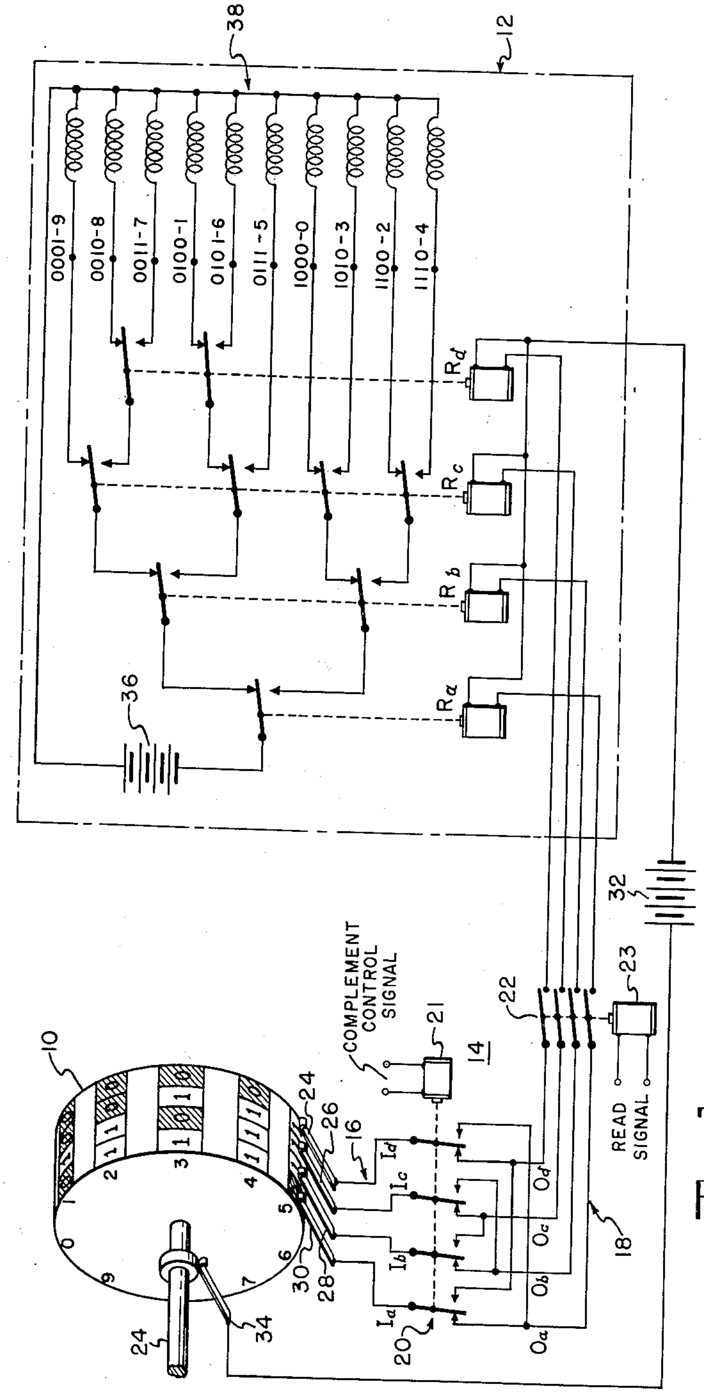

This invention relates to digital utilization techniques and more particularly to apparatus for the selective use of either a number or its complement.

In systems employing digital techniques there are cases where it is desirable to transmit the representation of a number or its complement to a utilization area such as a decoder, a storage device, etc. The term "complement" as used herein is that number or condition which when added respectively to another number or condition, provides an arbitrary parent number or condition as the case may be. For example, the 35's complement of 11 is 24; the 10's complement of 7 is 3; and the 9's complement of 5 is 4. In these examples, 35, 10 and 9 are arbitrary parent numbers. The term Z will be used hereinafter for the general case to represent the parent number or condition to which complementary numbers or conditions are referred to. A set of complementary numbers is a pair of numbers, each the Z's complement of the other. For example, 6 and 3 is a set of complementary numbers with respect to the parent 9, i.e., 6 is the 9's complement of 3, and 3 is the 9's complement of 6.

Heretofore, transmission of the 9's complement of a decimal number supplied to a system usually involved the employment of a 4-bit self-complementing binary code. A common undesirable characteristic of complementation using codes of this type is the necessity of operating separately on the information contained in each digit position of the numerical representation. One such example is the use of the excess-3 code and the inversion of each binary digit to obtain the 9's complement of a number, that is changing all 1's to 0's and all the 0's to 1's in a number representation. This kind of arrangement requires complex circuitry involving a minimum of one inverter and one gate for each binary digit position.

It is therefore an object of the present invention to provide novel and relatively simple apparatus for deriving the complement of a thing such as a number, condition, or other.

Another object of the invention is to provide relatively simple apparatus for deriving and transmitting the complement of a thing.

Another object is to provide apparatus requiring only a small number of components for selectively transmitting either a thing or its complement.

A further object is to provide relatively simple apparatus for selectively transmitting either representations of numbers indicative of different states, or representations of complements of such numbers.

The invention covers the derivation of the complement of a number, which number has been impressed on a transmission system in digital code form, by merely interchanging the transmission position of at least one digit in the code character of the number with that of another in the character.

In accordance with one embodiment of the invention, representations of numbers each of which denotes a different one of a plurality of conditions or states are impressed on a transmission line in the form of a digital code wherein the digits in each code representation of a number have a positional relation which yields the representation of a complement of the number when positions of the digits in at least one pair of digits in the number representation are interchanged with each other according to a uniform interchange pattern applicable to all complementary numbers and complementing is effected by a switching arrangement which interchanges according to said pattern the transmission positions of digits of a number representation impressed on the transmission line.

A full understanding of the invention will be had from the following description taken in connection with the drawing wherein a preferred embodiment of the invention is shown.

In the drawing:

FIG. 1 is a diagram of a wheel position sensing and transmitting system embodying the invention; and FIG. 2 is a chart showing an example of the codes which may be employed in connection with the invention.

Referring now to FIG. 1, the system shown includes a wheel 10, whose discrete positions as numerical representations are to be sensed and transmitted either in absolute or complementary form to a utilization device 12, for example the decoder shown, through a transmission circuit 14, which includes an input channel 16 and an output channel 18 connectable together in either one of two modes by a switch 20 which may be actuated by any suitable means for example in response to an appropriate command signal applied to an actuating coil 21. A switch 22, when operated, connects the output channel 18 to the device 12. This switch may also be operated by any appropriate means such as a "read" command signal applied to an associated actuating coil 23. While a decoder is shown, device 12 could be any other device which could utilize the code information transmitted along the transmission circuit 14, for example device 12 could be a storage device for storing the information.

The different states of the wheel 10 are sensed by stationary signal brushes 24, 26, 28 and 30, which cooperate with a binary coded pattern of conductive and insulated areas on the wheel 10 to encode the state of the wheel and impress a representation thereof on the input channel of the transmission circuit.

Wheel 10 may for example be one of the dial wheels in a reversible mechanical counting register, which in reversing through zero "counts down," that is gives a complementary indication instead of the absolute value of the number of increments in the reverse or negative direction. While such counting registers are found in many areas of use, a specific instance of use is as an accumulator in the add-subtract unit of a mechanical decimal calculating machine. The states or positions assumed by such accumulator wheels represent the decimal count in the accumulator. Such a wheel may have, as shown, ten discrete positions, each representing a different one of the decimal numbers 0 to 9, inclusive. The wheel may be fixed to a shaft 24 connected to the accumulator driving mechanism in the calculating machine. After each operation of a calculator involving the accumulator, the accumulator wheels lock in their respective discrete positions representative of the count in the accumulator.

The binary digits "1" and "0" may be evidenced and transmitted in a number of ways for example, by different electrical values such as different voltage values, different polarities, etc. In the particular example illustrated, binary "1" is signified by the presence of voltage and binary "0" is evidenced by absence of voltage.

The wheel 10 is made of conductive material such as aluminum, and is connected to a battery 32 through a brush 34. For each discrete position of the wheel there are four axially adjacent commutation zones on the rim of the wheel and lying under the signal brushes, one zone under each brush. Depending on the binary representation for a particular wheel position, each of the zones is either conductive or insulated to signify binary "1" or binary "0" as the case may be. Because the wheel is conductive, no particular treatment of a brush zone is needed to make it conductive to represent binary "1."

In order to represent a binary "0" a non-conductive zone is created for example by covering the zone with an insulating paint thus preventing direct contact between a brush and the conductive wheel rim. The insulated zones representing binary "0" are indicated in the drawing by shaded rectangles with a "0" in each, while the conductive zones representing binary "1" are indicated by clear rectangles with a "1" in each.

For any particular discrete position of the wheel a particular array of commutation zones will be presented to the signal brushes to impress, on the input channel 16 of the transmission circuit 14 a binary signal corresponding to the binary character representing the particular wheel position and its corresponding decimal number; that is, the decimal state of the wheel.

The wheel positions and the decimal numbers represented thereby are coded according to the binary code shown in FIG. 2 which is an example of the type of code that may be used in practicing the invention. This code is characterized by the fact that the digits of the binary code character of each decimal have a positional relation which yields the binary character for the 9's complement of the decimal when the position of each digit is interchanged with that of another in the character of the decimal. The particular positional interchange pattern for this code is 1st and 4th digits interchanged with each other and 2nd and 3rd digits interchanged with each other. The digit positions are numbered from left to right; thus the 1st digit is the leftmost digit. Thus, the code falls within the broad requirement in connection with this invention, that the code characters of complementary numbers have the same number of each kind of digit except that the position of at least one digit is interchanged with that of another. As related to binary codes, this means that the representation of a number has the same number of "0's" and the same number of "1's" as there are in the representation of the complement of the number, except that as compared to each other, positions of digits are mutually exchanged with each other. Construction of codes having the required characteristics is described hereinafter in greater detail.

The particular wheel position shown in the drawing represents the decimal 5 and is represented by the binary character 0111 according to the code in FIG. 2. The zones lying under brushes 24, 26 and 28 are conductive while the zone under brush 30 is insulated, and therefore the battery voltage which is continuously applied through brush 34 to the wheel rim appears at brushes 24, 26 and 28 indicating a binary "1" at each of these positions, while absence of voltage at brush 30 due to the insulated zone thereunder, indicates a binary "0" at that position. Thus the binary representation 0111 for decimal 5 is impressed on the input channel 16 of the transmission circuit.

Depending upon the position of switch 20, the binary signal appearing at the signal brushes is transferred from the input channel 16 to the output channel 18 either unaltered or with the positions of digits interchanged with those of others. In the normal or unoperated state, which is shown in the drawing, switch 20 connects input lines I*a*, I*b*, I*c*, and I*d* to the corresponding output lines O*a*, O*b*, O*c* and O*d*, respectively, thus transferring the binary signal unaltered from the input channel 16 to the output channel 18. However, in its operated condition, switch 20 connects input line I*a* to output line O*d*, input line I*b* to output line O*c*, input line I*c* to output line O*b* and input line I*d* to output line O*a*, thus interchanging the transmission positions of the first and fourth digits with each other and of the second and third digits with each other, thereby impressing on the output channel 18 the binary character for the complement of the number whose binary character is impressed on the input channel 16. The binary representation carried by the output channel 18 is "read" into the decoder 12 by operating the switch 22.

Decoder 12, by way of example, is in the form of a relay transfer tree that provides a separate output line for each different binary representation applied to its input which includes the energizing coils of four relays R*a*, R*b*, R*c*, and R*d* corresponding to the number of digits in the code employed, and which are connected respectively to the output channel lines O*a*, O*b*, O*c* and O*d*. Each relay coil is energized only when a binary "1" signal is applied to it. Each of the output lines of the decoder is marked with the binary character which when applied to the decoder input will energize that line from a battery 36, and is also marked with the decimal represented by the corresponding input binary character. The decoder output lines are shown connected to operator coils 38 which may be those of solenoids for actuating a display, or a printer, or other apparatus.

The operation of the decoder should be apparent from an inspection thereof keeping in mind that its relay coils are shown unenergized and all relay contacts in the decoder appear in the normal or unoperated condition. The illustrated consecutive order of the decoder input relays is the same as the consecutive order of the respective binary digit positions of the code (FIG. 2) employed.

Operation of the system is illustrated by an example involving the particular position of the wheel shown in the drawing, which position as sensed at the signal brushes corresponds to the decimal 5 and is represented by the binary code character 0111. The latter is "picked up" by the signal brushes and impressed on the input of the transmission circuit. Input lines I*b*, I*c*, and I*d* each carry the signal for a binary "1," while line I*a* by absence of voltage "conveys" the information of binary "0." In its unoperated condition, switch 20 transfers the binary information from the input channel 16 to the output channel 18 without change and when switch 22 is operated, output channel 18 applies the original binary character 0111 to the input relay coils of the decoder. As a result, the decoder output line marked 0111 and 5 is activated. Thus, the true value of the decimal 5 representing the state of the wheel 10, was transmitted from the wheel to the decoder by way of the code character therefor.

Employing the same example, that is with binary 0111 impressed on the input channel 16, but with the complementing switch 20 operated, the switch interchanges the transmission positions of the first and fourth digits and also of the second and third digits, thus converting binary 0111 to binary 1110 and impressing the latter on the output channel 18. According to the code of FIG. 2, 1110 is the binary representation or code character for decimal 4, the 9's complement of decimal 5, whose binary code character was originally impressed on the input channel 16 through the signal brushes. Now when switch 22 is operated, the binary signal 1110 is applied to the input relay coils of the decoder, and the decoder output line marked 1110 and 4 will be energized. Thus, decimal 5 representing the state of the wheel 10, is 9's complemented during transmission by the complementing switch 20.

Important considerations in constructing a code for use in connection with the invention are the number of different states to be represented and the requirement that among a plurality of code characters, each of which represents a different state or number, code characters for complementary numbers or conditions have the same number of each kind of digit except that the position of at least one digit is interchanged with that of another. This requirement means that the code should be a digital code wherein the interchange of the position of at least one digit with that of another in the same coded representation of a number yields the representation of the complement of the number. The requirement is illustrated by the following series of examples, the first three of which are in connection with 9's complements, the next in connection with 10's complements, and the last with 54's complements. It will be noted that in each of these examples the representation of the complement of a number is yielded by the mutual exchange of positions of digits in the representation of the number.

In the 4-bit code of FIG. 2, 0101 and 1010 are the binary representations (code characters) of the 9's complementary numbers 6 and 3 respectively. Both code characters have the same number of "0's" (two), and the same number of "1's" (two), except that the 1st and 4th digits are interchanged and the 2nd and 3rd digits are also interchanged. In this example the positions of the digits have been interchanged with each other in each pair of two pairs of digits, 1st and 4th being one pair and 2nd and 3rd being the other pair, thus meeting the requirement that positions of digits are interchanged with each other.

In a 5-bit code suppose that 01001 and 01010 are the respective binary representations for the 9's complementary numbers 2 and 7. Both have the same number of each kind of digit, three 0's and two 1's, except that the 4th and 5th digits are interchanged. Here, the positions of the digits in a pair of digits have been interchanged, and again "positions of digits are interchanged with each other."

In another 5-bit code suppose that 00011 and 11000 are the binary code characters for the 9's complementary numbers 2 and 7 respectively. Both code characters have the same number of each kind of digit, three 0's and two 1's, with the positions of the 1st and 5th digits interchanged with each other and those of the 2nd and 4th digits also interchanged with each other. In this case there is an interchange with each other of the positions of the digits in each pair of two pairs of digits. The expression "positions of digits are interchanged with each other" fits this example also.

Suppose in a 4-bit code, that 0011 and 1100 be the respective code characters for the 10's complementary numbers 4 and 6. Again both code characters have the same digits quantitatively, but the 1st digit is interchanged with the 3rd, and the 2nd digit is interchanged with the 4th. Here in each pair of two pairs of digits (1st and 3rd are one pair, 2nd and 4th are the second pair) the positions of the digits have been interchanged with each other. In this example positions of digits are interchanged. This example could also have occurred following the interchange pattern of 1st with 4th, and 2nd with 3rd.

Now considering a 6-bit code, the respective binary characters 010101 and 101010 may arbitrarily represent two complementary numbers for example 15 and its 54's complement 39. Again both code characters have the same number of each kind of digit. Although, as a practical matter, only one interchange pattern is selected to apply to all complementary numbers, the digit position interchange pattern in this example could be one of three: 1st with 2nd, 3rd with 4th, and 5th with 6th; or 1st with 4th, 2nd with 5th, and 3rd with 6th; or 1st with 6th, 2nd with 5th, and 3rd with 4th. In every one of these three interchange patterns, the positions of the digits have been interchanged with each other in each pair of three pairs of digits, again meeting the general requirement that positions of digits are interchanged.

In each of the above cited examples the code characters for complementary numbers have the same number of each kind of digit, and the position of at least one digit is interchanged with that of another. From the above illustrations it will be seen that in order to practice the invention the apparatus components should be related by a digital code wherein the code representation of the complement of a number is yielded by interchanging with each other the positions of the digits in at least one pair of digits of the code representation of the number. A pair of digits is any two digits, like or unlike, of a code representation of a number.

A further code requirement in the practice of the invention is that the interchange pattern be the same for a plurality of sets of complementary numbers or conditions. For example, in the code of FIG. 2 the interchange pattern of 1st with 4th, and 2nd with 3rd is the same for all sets of 9's complementary numbers.

The following is an outline of a general procedure which may be followed for constructing a code for use in connection with the invention. To effect the purposes of the invention the codes need not be weighted. First consideration is the number of bits required to provide a different character for each different condition or number to be represented. While an $n$-bit binary code has $2^n$ possible combinations, all cannot be used because some are not altered by any interchange pattern, while others will not be altered by the particular interchange pattern chosen. These may be called normally ambiguous characters. Characters which are never altered regardless of interchange pattern are the all 0, such as 000, 0000, 00000, etc., and the all 1 such as 111, 1111, 11111, etc. An example of a character which is not altered by a particular interchange pattern is 0110 where the interchange pattern is 1st with 4th and 2nd with 3rd. A normally ambiguous character may represent $$\frac{Z}{2}$$

where Z is an even number, so that $$\frac{Z}{2}$$

is the Z's complement of $$\frac{Z}{2}$$

In such case alteration of the character by the interchange pattern employed for the rest of the code is not desired. For example in a code constructed to yield 10's complements by a particular interchange pattern, the code character for 5 should remain unchanged when operated upon by the interchange pattern.

In a 4-bit code and an interchange pattern involving all of the bits, there are 4 normally ambiguous characters, thus leaving 12 different characters available to represent 12 different conditions or numbers. In case Z is an even number, then a normally ambiguous character such as 0000 will also be available for $$\frac{Z}{2}$$

An interchange pattern involving less than all the digit positions of the code reduces the number of unambiguous code characters available. For example, in a 4-bit code where characters for complementary numbers have an interchange pattern, that interchanges each digit position with that of another such as the code in FIG. 2 there are 12 possible unambiguous code characters. However, if in a 4-bit code the interchange pattern involves only an interchange of one digit with that of another, there will be only 8 unambiguous code characters available. For the general case, if $n$ is the number of digits and $m$ the number of these digits on which an interchange is effected ($m$ is always even), then the total number of conditions or numbers which may be represented (number of unambiguous code characters) is:

$$2^{n-\frac{m}{2}}\left(2^{\frac{m}{2}}-1\right)=x$$

To build the code any available code character (unambiguous character) of an $n$-digit code is arbitrarily assigned to represent any one of the different conditions or numbers to be represented (except $$\frac{Z}{2}$$

if Z is even). This first arbitrary selection immediately dictates the code character for the complement of the number involved in the first selection in order to comply with the particular interchange pattern chosen. For example in constructing a 4-bit 9's complementing code to represent the 10 different decimal values 0–9, employing a complementing digit position interchange pattern involving 1st with 3rd and 2nd with 4th, the character 0110 is one of the twelve unambiguous characters available and it may be arbitrarily assigned to any one of the decimals 0–9. Suppose it is assigned to represent decimal 6. Then its inversion within the selected pattern of interchange must represent the 9's complement of 6, that is 1001 must be assigned to decimal 3. Next another unassigned one of the 12 unambiguous characters is assigned to represent another one of the decimals 0–9 other than 6 and 3. For example let 0010 represent decimal 5. Then 1000 must represent 4 the 9's complement of 5. This process of selection is continued until all the decimals 0–9 have been matched with a different one of the available unambiguous code characters.

The following is an example of a 10's complementing 4-bit code constructed in accordance with the directions herein, and which may be employed in connection with the invention. The interchange pattern in this example is 1st with 2nd, and 3rd with 4th digits.

*10's Complementing code*

| Binary: | Decimal |
|---|---|
| 0001 | 0 |
| 0100 | 1 |
| 0101 | 2 |
| 0110 | 3 |
| 0111 | 4 |
| 0011 | 5 |
| 1011 | 6 |
| 1001 | 7 |
| 1010 | 8 |
| 1000 | 9 |
| 0010 | 10 |

Interchange Pattern for Obtaining 10's Complement: Interchange 1st and 2nd Columns, with each other, and 3rd and 4th columns with each other.

The following chart illustrates some of the possibilities of a 5-bit code which are usable in connection with the present invention.

*Chart illustrating some possibilities of 5-bit code*

| Interchange Pattern: inter-Change Cols. 1 and 4, Also Cols. 2 and 3 | | Interchange Pattern: Inter-Change Cols. 4 and 5 |
|---|---|---|
| amb. | 00000 | amb. |
| amb. | 00001 | A |
| A | 00010 | A |
| B | 00011 | amb. |
| C | 00100 | amb. |
| D | 00101 | B |
| E | 00110 | B |
| F | 00111 | amb. |
| C | 01000 | amb. |
| D | 01001 | C |
| G | 01010 | C |
| H | 01011 | amb. |
| amb. | 01100 | amb. |
| amb. | 01101 | D |
| I | 01110 | D |
| J | 01111 | amb. |
| A | 10000 | amb. |
| B | 10001 | E |
| amb. | 10010 | E |
| amb. | 10011 | amb. |
| G | 10100 | amb. |
| H | 10101 | F |
| K | 10110 | F |
| L | 10111 | amb. |
| E | 11000 | amb. |
| F | 11001 | G |
| K | 11010 | G |
| L | 11011 | amb. |
| I | 11100 | amb. |
| J | 11101 | H |
| amb. | 11110 | H |
| amb. | 11111 | amb. |

Total possibilities for a 5-bit code are $2^5=32$. The letters in the left column indicate the possibilities for use with the invention with a digit position interchange pattern interchanging 1st with 4th, and 2nd with 3rd. Twenty-four different values may be represented and complemented. This may be demonstrated by substituting the actual values in the equation:

$$x=2^{n-\frac{m}{2}}(2^{\frac{m}{2}}-1)$$

$$x=2^{5-\frac{4}{2}}(2^{\frac{4}{2}}-1)$$

$$x=24$$

All alphabetic pairs may be assigned to represent the numbers in sets of complementary numbers. For example the A's (00010 and 10000) may respectively represent two numbers which are the Z's complements of each other. The marking "amb." means ambiguous, that is the code character does not change when operated upon by the interchange pattern.

The letters on the right side of the 5-bit code chart indicate the possibilities for use in connection with the invention when the interchange pattern involves only the 4th and 5th digits. Again substituting in the formula:

$$x=2^{n-\frac{m}{2}}(2^{\frac{m}{2}}-1)$$

$$x=2^{5-\frac{2}{2}}(2^{\frac{2}{2}}-1)$$

$$x=16$$

Sixteen different values may be represented and complemented. Again each alphabetic pair may be assigned to complementary numbers.

It should be understood that instead of the accumulator wheel and signal brushes, other digital information sources may be employed for example, digital storage and associated read out apparatus, digital keyboards, various types of digital encoders, etc.

While conventional relays are shown in various parts of the illustrated embodiment, other well known relay and switching techniques may be employed such as diode switching and matrix circuits.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. Apparatus comprising transmission means having a plurality of input and output terminals, said input terminals being electrically isolated from each other, a digital information source coupled to said input terminals for supplying digital representations to said transmission means, and two mode switch means in said transmission means for selectively transmitting either a representation supplied to it or a representation having the same digits of the representation supplied to it, but with the position of at least one digit interchanged with that of another, said switch means in one mode providing a connection from each input terminal solely to a different output terminal in unchanged digital order, and in the other mode providing a connection from each input terminal solely to a different output terminal but with at least one pair of input terminals connected to output terminals in reversed digital order with respect to said pair of input terminals, and means for selectively operating said switch means in either mode.

2. Apparatus comprising a source of different representations each representing a different one of a plurality of values according to an $n$-bit digital code wherein representations of complementary values have the same number of each kind of digit but the position of at least one digit is interchanged with that of another according to a uniform interchange pattern applicable to a plurality of sets of complementary values, and transmission means having a plurality of $n$ input terminals and $n$ output terminals, said input terminals being electrically isolated from each other, each input terminal being connected solely to a different output terminal, the connections between said input and output terminals being in accordance with said interchange pattern to produce an output terminal array differing from the input terminal array by said interchange pattern, whereby information containing the digits impressed on the input terminals is transferred to the output terminals, but with positions of digits interchanged according to said interchange pattern.

3. Apparatus comprising a source of representations of values in the form of an $n$-bit digital code wherein the digits have such a positional relation that an interchange of the position of at least one digit with that of another within a representation of a value in a uniform interchange pattern applicable to the representations of a plurality of sets of complementary values will yield the representation of a complement of the value originally represented, two-mode switch means having a plurality of $n$ input channels electrically isolated from each other and $n$ output channels, the input channels being coupled to said source, said switch means being operable in one mode to connect each input channel solely to a different output channel to provide an output channel array conforming with the input channel array thereby to supply to the output channels the representation in said code carried by the input channels, said switch means being operable in the other mode to connect each input channel solely to a different output channel in accordance with said interchange pattern thereby to supply to the output channels a representation in said code containing the digits of the representation carried by the input channels, but with the position of at least one digit interchanged with that of another in accordance with said interchange pattern, and means for selectively operating said switch means in either of said modes.

4. Apparatus comprising a source of representations of values in the form of an $n$-bit digital code wherein the digits have such a positional relation that an interchange with each other of positions of at least some of the digits within a representation of a value in a uniform interchange pattern applicable to the representations of a plurality of sets of complementary values will yield the representation of a complement of the value originally represented, transmission means having a plurality of $n$ input and $n$ output channels, the input channels being coupled to said source, utilization means coupled to said output channels, two-mode coupling means between said input and output channels which in one mode supplies the output channels with a representation in said code carried by the input channels, and in the other mode supplies the output channels with a representation in said code containing the digits of the representation carried by the input channels, but with the positions of at least some of the digits interchanged with each other in accordance with said interchange pattern, said coupling means comprising a two-mode switch having $n$ input terminals connected to said input channels and $n$ output terminals connected to said output channels, said input terminals being electrically isolated from each other, in one mode each input terminal being connected solely to a different output terminal in accordance with the pattern of the input to provide an output terminal array similar to the input terminal array, in the other mode each input terminal being connected solely to a different output terminal in accordance with said interchange pattern to provide an output terminal array differing from the input terminal array by said interchange pattern, and means for selectively operating said switch in either of said modes.

5. Apparatus for 9's complementing comprising a source of representations of decimal numerals in the form of an $n$-bit binary code wherein $n$ is at least 4 and the digits have such a positional relation that an interchange of the position of at least one digit with that of another within a representation of a numeral in a uniform interchange pattern applicable to the representations of all the sets of 9's complementary numerals will yield the representation of the 9's complement of the numeral originally represented, two-mode switch means having $n$ input channels electrically isolated from each other and $n$ output channels, the input channels being coupled to said source, said switch means being operable in one mode to connect each input channel solely to a different output channel to provide an output channel array conforming with the input channel array thereby to supply to the output channels the representation in said code carried by the input channels, said switch means being operable in the other mode to connect each input channel solely to a different output channel in accordance with said interchange pattern thereby to supply to the output channels a representation in said code of the 9's complement of the numeral whose representation is carried by the input channels, and means for selectively operating said switch means in either of said modes.

6. Apparatus for 9's complementing comprising a source of representations of different decimal numerals in the form of an $n$-bit binary code wherein $n$ is at least 4 and representations of 9's complementary numerals have the same number of each kind of digit but with the positions of at least some of the digits interchanged with each other according to a uniform interchange pattern applicable to all the sets of 9's complementary numerals, utilization means, and transmission means for coupling said source to said utilization means, said transmission means having $n$ input terminals connected to said source and $n$ output terminals connected to said utilization means, said input terminals being electrically isolated from each other, each of said input terminals being connected solely to a different output terminal in accordance with said interchange pattern for supplying to said utilization means a representation in said code of the 9's complement of the numeral whose representation in said code is impressed on the transmission circuit by said source.

7. Apparatus for 9's complementing comprising a source of representations of decimal numerals in the form of an $n$-bit binary code wherein $n$ is at least 4 and the digits have such a positional relation that an interchange with each other of positions of at least some of the digits within a representation of a numeral in a uniform interchange pattern applicable to the representations of all the sets of 9's complementary numerals will yield the representation of a 9's complement of the numeral originally represented, transmission means having $n$ input and $n$ output channels, the input channels being coupled to said source, utilization means coupled to said output channels, two-mode coupling means between said input and output channels, which in one mode supplies the output channels with a representation in said code carried by the input channels, and in the other mode supplies the output channels with a representation in said code of the 9's complement of the numeral whose representation is carried by the input channels, said coupling means comprising a two-mode switch having $n$ input terminals connected to said input channels and $n$ output terminals connected to said output channels, said input terminals being electrically isolated from each other, in one mode each input terminal being connected solely to a different output terminal in accordance with the pattern of the input to provide an output terminal array similar to the input terminal array, in the other mode each input terminal being connected solely to a different output terminal in accordance with said interchange pattern to provide an output terminal array differing from the input terminal array by said interchange pattern, and means for selectively operating said switch in either of said modes.

8. Apparatus for 9's complementing comprising encoding means responsive to each of a plurality of different conditions for encoding each of said conditions into a different representation corresponding to a decimal number according to an $n$-bit binary code wherein $n$ is at least 4 and an interchange with each other of the position of at least one digit with that of another in a representation of a number according to an interchange pattern applicable to the representations of all the sets of 9's complementary numbers yields the representation of the 9's complement of the number, utilization means, and transmission means for connecting the encoding means to the utilization means, said transmission means having two selectable modes of transmission, one for transmitting the originally encoded information, and another for interchanging transmission positions of digits of an encoded representation in accordance with said interchange pattern whereby the transmission means supplies to the utilization means a representation in said code of the 9's complement of an encoded number representation, said transmission means having $n$ input terminals connected to said encoding means and $n$ output terminals connected to said utilization means, said input terminals being electrically isolated from each other, in said one mode each input terminal being connected solely to a different output terminal in an unchanged pattern, in the other mode each input terminal being connected solely to a different output terminal in accordance with said interchange pattern.

References Cited in the file of this patent

UNITED STATES PATENTS

| | | |
|---|---|---|
| 1,938,899 | Gilman | Dec. 12, 1933 |
| 2,676,289 | Wulfsberg et al. | Apr. 20, 1954 |
| 2,679,644 | Lippel et al. | May 25, 1954 |
| 2,719,290 | Bland | Sept. 27, 1955 |
| 2,736,017 | Marlowe et al. | Feb. 21, 1956 |
| 2,750,584 | Goldfischer | June 12, 1956 |
| 2,823,344 | Ragland | Feb. 11, 1958 |
| 2,852,764 | Frothingham | Sept. 16, 1958 |